(12) United States Patent
Rees et al.

(10) Patent No.: US 9,724,852 B1
(45) Date of Patent: Aug. 8, 2017

(54) HIGH DENSITY COMPOSITES COMPRISING RECLAIMED CARPET MATERIAL

(75) Inventors: John J. M. Rees, Chattanooga, TN (US); Gregory Fowler, Rocky Face, GA (US)

(73) Assignee: Columbia Insurance Company, Omaha, NE (US)

( * ) Notice: Subject to any disclaimer, the term of this patent is extended or adjusted under 35 U.S.C. 154(b) by 331 days.

(21) Appl. No.: 12/786,047

(22) Filed: May 24, 2010

Related U.S. Application Data

(60) Provisional application No. 61/180,709, filed on May 22, 2009.

(51) Int. Cl.
  C08J 11/04 (2006.01)
  B29C 43/00 (2006.01)
  B29L 31/00 (2006.01)

(52) U.S. Cl.
  CPC ..... *B29C 43/003* (2013.01); *B29L 2031/7322* (2013.01); *B32B 2305/70* (2013.01); *B32B 2307/722* (2013.01)

(58) Field of Classification Search
  CPC .............................................. B29L 2031/7322
  USPC ..................................... 264/913, 911; 7/913
  See application file for complete search history.

(56) References Cited

U.S. PATENT DOCUMENTS

| | | | |
|---|---|---|---|
| 3,497,414 A | 2/1970 | Blue et al. | |
| 3,526,556 A | 9/1970 | Berner et al. | |
| 3,591,444 A | 7/1971 | Hoppe et al. | |
| 3,600,261 A | 8/1971 | Kerres et al. | |
| 3,607,999 A | 9/1971 | Corbett et al. | |
| 3,616,029 A | 10/1971 | Lerman | |
| 3,630,813 A | 12/1971 | Allen | |
| 3,650,867 A | 3/1972 | Bauer | |
| 3,661,674 A | 5/1972 | Higgs et al. | |
| 3,661,691 A | 5/1972 | Slosberg | |
| 3,686,046 A | 8/1972 | Crowley et al. | |
| 3,717,597 A | 2/1973 | Hesskamp et al. | |
| 3,746,610 A | 7/1973 | Hoegger | |
| 3,817,817 A | 6/1974 | Pickens et al. | |
| 3,821,065 A | 6/1974 | Copeland | |
| 3,834,978 A | 9/1974 | Green et al. | |
| 3,894,973 A | 7/1975 | Yunan | |
| 3,917,774 A | 11/1975 | Sagane et al. | |
| 3,922,454 A | 11/1975 | Roecker | |
| 3,951,717 A | 4/1976 | Herweg et al. | |

(Continued)

FOREIGN PATENT DOCUMENTS

DE 4212757 A1 10/1992
EP 0135595 A1 4/1985

(Continued)

OTHER PUBLICATIONS

Response to Final Office Action filed Jul. 20, 2015 with the United States Patent and Trademark Office for U.S. Appl. No. 12/786,044, filed May 24, 2010 (Inventor—Rees, et al.; Applicant—Columbia Insurance Co.) (8 pages).

(Continued)

*Primary Examiner* — Galen Hauth
(74) *Attorney, Agent, or Firm* — Ballard Spahr LLP (57) ABSTRACT

Disclosed are methods for utilizing reclaimed carpet materials in the manufacture of high density composites. Also disclosed are products manufactured by the disclosed methods.

18 Claims, 1 Drawing Sheet

(56) References Cited

U.S. PATENT DOCUMENTS

| | | | |
|---|---|---|---|
| 3,952,126 A | 4/1976 | Dycks | |
| 4,014,826 A | 3/1977 | Yunan | |
| 4,082,703 A | 4/1978 | Duffy et al. | |
| 4,185,146 A | 1/1980 | Burke | |
| 4,243,617 A | 1/1981 | Burge | |
| 4,255,372 A | 3/1981 | Kuhnel et al. | |
| 4,269,889 A | 5/1981 | Takagi | |
| 4,296,054 A | 10/1981 | Takagi | |
| 4,330,494 A | 5/1982 | Iwata et al. | |
| 4,342,802 A | 8/1982 | Pickens, Jr. et al. | |
| 4,417,932 A | 11/1983 | Breitscheidel et al. | |
| 4,438,221 A | 3/1984 | Fracalossi et al. | |
| 4,443,286 A | 4/1984 | Ikeda et al. | |
| 4,579,764 A | 4/1986 | Peoples, Jr. et al. | |
| 4,594,284 A | 6/1986 | Nakagawa et al. | |
| 4,683,246 A | 7/1987 | Davis et al. | |
| 4,827,817 A | 5/1989 | Grohoski et al. | |
| 4,836,871 A | 6/1989 | Kato | |
| 4,923,547 A | 5/1990 | Yamaji et al. | |
| 5,045,389 A | 9/1991 | Campagna | |
| 5,104,693 A | 4/1992 | Jenkines | |
| 5,108,691 A | 4/1992 | Elliott | |
| 5,175,046 A | 12/1992 | Nguyen | |
| 5,175,194 A | 12/1992 | Ward et al. | |
| 5,178,193 A | 1/1993 | Sato et al. | |
| 5,182,162 A | 1/1993 | Andrusko | |
| 5,240,530 A | 8/1993 | Fink | |
| 5,251,543 A | 10/1993 | Brothers | |
| 5,258,085 A | 11/1993 | Breitscheidel et al. | |
| 5,286,321 A | 2/1994 | Fuss | |
| 5,290,818 A | 3/1994 | Nafziger et al. | |
| 5,294,384 A | 3/1994 | David et al. | |
| 5,312,888 A | 5/1994 | Nafziger et al. | |
| 5,494,628 A | 2/1996 | Beyer et al. | |
| 5,494,723 A * | 2/1996 | Erren et al. | 428/95 |
| 5,534,208 A | 7/1996 | Barr et al. | |
| 5,540,968 A | 7/1996 | Higgins | |
| 5,585,185 A | 12/1996 | Smith et al. | |
| 5,610,207 A | 3/1997 | de Simone et al. | |
| 5,695,133 A | 12/1997 | Morse, Jr. et al. | |
| 5,695,865 A | 12/1997 | Shimizu | |
| 5,817,703 A | 10/1998 | Blair et al. | |
| 5,869,173 A | 2/1999 | Zheng et al. | |
| 5,880,165 A | 3/1999 | Triolo et al. | |
| 6,130,261 A | 10/2000 | Harfmann | |
| 6,133,172 A | 10/2000 | Sevenish et al. | |
| 6,136,870 A | 10/2000 | Triolo et al. | |
| 6,206,669 B1 | 3/2001 | Lewit et al. | |
| 6,235,391 B1 | 5/2001 | Contreras et al. | |
| 6,241,168 B1 * | 6/2001 | Young et al. | 241/23 |
| 6,269,724 B1 | 8/2001 | Sabatelli et al. | |
| 6,316,075 B1 | 11/2001 | Desai et al. | |
| 6,344,254 B1 | 2/2002 | Smith et al. | |
| 6,378,179 B1 | 4/2002 | Hirsch | |
| 6,503,595 B1 | 1/2003 | Kim et al. | |
| 6,623,676 B1 | 9/2003 | Davis et al. | |
| 6,716,890 B1 | 4/2004 | Niederoest et al. | |
| 6,794,009 B1 | 9/2004 | Brodeur, Jr. et al. | |
| 6,872,445 B2 | 3/2005 | Vinod | |
| 6,884,837 B2 | 4/2005 | Kohlhammer et al. | |
| 7,022,751 B2 | 4/2006 | Zhang et al. | |
| 7,045,590 B2 | 5/2006 | Bell | |
| 7,056,567 B2 | 6/2006 | O'Neill et al. | |
| 7,144,534 B2 | 12/2006 | Buchel et al. | |
| 7,207,744 B2 | 4/2007 | Jones, IV. et al. | |
| 7,264,854 B2 | 9/2007 | Stroppiana | |
| 7,279,058 B2 | 10/2007 | Morgan | |
| 7,279,065 B1 | 10/2007 | Ogle et al. | |
| 7,514,026 B1 * | 4/2009 | Zafiroglu | 264/112 |
| 2002/0092634 A1 | 7/2002 | Rokman et al. | |
| 2002/0124366 A1 | 9/2002 | Hirsch | |
| 2002/0132085 A1 * | 9/2002 | Higgins | D06N 7/0086 428/95 |
| 2003/0072911 A1 | 4/2003 | Higgins et al. | |
| 2003/0129354 A1 | 7/2003 | Burke et al. | |
| 2003/0170420 A1 | 9/2003 | Higgins et al. | |
| 2003/0194546 A1 | 10/2003 | McCabe | |
| 2003/0203152 A1 | 10/2003 | Higgins et al. | |
| 2003/0203153 A1 | 10/2003 | Jones | |
| 2003/0220039 A1 | 11/2003 | Chen et al. | |
| 2004/0048036 A1 | 3/2004 | Nakasuji et al. | |
| 2004/0062903 A1 | 4/2004 | Evans et al. | |
| 2004/0077247 A1 | 4/2004 | Schmidt et al. | |
| 2004/0176003 A1 | 9/2004 | Yang et al. | |
| 2004/0191469 A1 | 9/2004 | Brodeur et al. | |
| 2004/0224589 A1 | 11/2004 | Bacon et al. | |
| 2005/0019539 A1 | 1/2005 | Pike | |
| 2005/0199755 A1 | 9/2005 | Sumida et al. | |
| 2005/0212166 A1 | 9/2005 | Seo et al. | |
| 2005/0260913 A1 | 11/2005 | Doesburg | |
| 2005/0287334 A1 | 12/2005 | Wright et al. | |
| 2006/0001187 A1 | 1/2006 | Allen, III et al. | |
| 2006/0032175 A1 | 2/2006 | Chen et al. | |
| 2006/0035990 A1 | 2/2006 | Hennington et al. | |
| 2006/0068188 A1 | 3/2006 | Morse et al. | |
| 2006/0106124 A1 | 5/2006 | Fink et al. | |
| 2006/0125158 A1 | 6/2006 | Rouanet et al. | |
| 2006/0144012 A1 | 7/2006 | Manning et al. | |
| 2006/0199454 A1 | 9/2006 | Blanpied et al. | |
| 2006/0225952 A1 | 10/2006 | Takayasu et al. | |
| 2006/0280902 A1 | 12/2006 | Otteson et al. | |
| 2007/0039268 A1 | 2/2007 | Ambrose, Jr. et al. | |
| 2007/0043128 A1 | 2/2007 | Jenkines et al. | |
| 2007/0066174 A1 | 3/2007 | Bacon | |
| 2007/0087160 A1 | 4/2007 | Wright | |
| 2007/0116991 A1 | 5/2007 | Balthes et al. | |
| 2007/0218260 A1 | 9/2007 | Miclo et al. | |
| 2007/0256970 A1 | 11/2007 | DiLeo et al. | |
| 2007/0275207 A1 | 11/2007 | Higgins et al. | |
| 2007/0286982 A1 | 12/2007 | Higgins et al. | |
| 2008/0008862 A1 | 1/2008 | Ogle et al. | |
| 2008/0050577 A1 | 2/2008 | Gilder et al. | |
| 2008/0063875 A1 | 3/2008 | Robinson et al. | |
| 2008/0075915 A1 | 3/2008 | Wening et al. | |
| 2008/0098935 A1 | 5/2008 | Roth et al. | |
| 2008/0124533 A1 | 5/2008 | Bouckaert et al. | |
| 2010/0267304 A1 | 10/2010 | Fowler | |

FOREIGN PATENT DOCUMENTS

| | | | |
|---|---|---|---|
| EP | 0312090 A2 | 4/1989 | |
| EP | 0387340 A1 | 9/1990 | |
| EP | 0642894 A1 | 3/1995 | |
| EP | 0646452 A2 | 4/1995 | |
| EP | 0695730 A2 | 2/1996 | |
| EP | 0719301 A1 | 7/1996 | |
| EP | 0776741 A1 | 6/1997 | |
| EP | 0818304 A2 | 1/1998 | |
| EP | 1042106 A1 | 10/2000 | |
| EP | 1272701 A2 | 1/2003 | |
| JP | 2002067257 A | 3/2002 | |
| JP | 2004100337 A | 4/2004 | |
| WO | WO-9109725 A1 | 7/1991 | |
| WO | WO-9852730 A1 | 11/1998 | |
| WO | WO-02053815 A1 | 7/2002 | |
| WO | WO-03008701 A1 | 1/2003 | |
| WO | WO-03106761 A1 | 12/2003 | |
| WO | WO-2004053222 A2 | 6/2004 | |
| WO | WO-2005033410 A2 | 4/2005 | |
| WO | WO-2005042136 A2 | 5/2005 | |
| WO | WO-2006058093 A1 | 6/2006 | |
| WO | WO-2006107847 A2 | 10/2006 | |
| WO | WO-2006/127080 A1 | 11/2006 | |
| WO | WO-2007049973 A2 | 5/2007 | |
| WO | WO-2007095730 A1 | 8/2007 | |
| WO | WO-2007146282 A1 | 12/2007 | |

OTHER PUBLICATIONS

Advisory Action issued on Feb. 26, 2015 by the United States Patent and Trademark Office for U.S. Appl. No. 12/786,044, filed May 24, 2010 (Inventor—Rees, et al.; Applicant—Columbia Insurance Co.) (3 pages).

(56) References Cited

OTHER PUBLICATIONS

Amendment After Final Office Action Under 37 C.F.R. 1.116 filed Feb. 26, 2015 with the United States Patent and Trademark Office for U.S. Appl. No. 12/786,044, filed May 24, 2010 (Inventor—Rees, et al.; Applicant—Columbia Insurance Co.) (10 pages).
Response to Final Office Action filed Feb. 18, 2015 with the United States Patent and Trademark Office for U.S. Appl. No. 12/786,044, filed May 24, 2010 (Inventor—Rees, et al.; Applicant—Columbia Insurance Co.) (10 pages).
Notice of Appeal Filed Feb. 18, 2015 with the United States Patent and Trademark Office for U.S. Appl. No. 12/786,044, filed May 24, 2010 (Inventor—Rees, et al.; Applicant—Columbia Insurance Co.) (1 page).
Final Office Action issued on Aug. 18, 2014 by the United States Patent and Trademark Office for U.S. Appl. No. 12/786,044, filed May 24, 2010 (Inventor—Rees, et al.; Applicant—Columbia Insurance Co.) (10 pages).
Response to Non-Final Office Action filed Aug. 5, 2014 with the United States Patent and Trademark Office for U.S. Appl. No. 12/786,044, filed May 24, 2010 (Inventor—Rees, et al.; Applicant—Columbia Insurance Co.) (8 pages).
Non-Final Office Action issued on Feb. 5, 2014 by the United States Patent and Trademark Office for U.S. Appl. No. 12/786,044, filed May 24, 2010 (Inventor—Rees, et al.; Applicant—Columbia Insurance Co.) (11 pages).
Response to Final Office Action filed Jan. 14, 2014 with the United States Patent and Trademark Office for U.S. Appl. No. 12/786,044, filed May 24, 2010 (Inventor—Rees, et al.; Applicant—Columbia Insurance Co.) (8 pages).
Notice of Appeal filed Jul. 8, 2013 with the United States Patent and Trademark Office for U.S. Appl. No. 12/786,044, filed May 24, 2010 (Inventor—Rees, et al.; Applicant—Columbia Insurance Co.) (2 pages).
Final Office Action issued on Jan. 8, 2013 by the United States Patent and Trademark Office for U.S. Appl. No. 12/786,044, filed May 24, 2010 (Inventor—Rees, et al.; Applicant—Columbia Insurance Co.) (12 pages).
Response to Non-Final Office Action filed Dec. 13, 2012 with the United States Patent and Trademark Office for U.S. Appl. No. 12/786,044, filed May 24, 2010 (Inventor—Rees, et al.; Applicant—Columbia Insurance Co.) (9 pages).
Non-Final Rejection issued Jun. 13, 2012 by the United States Patent and Trademark Office for U.S. Appl. No. 12/786,044, filed May 24, 2010 (Inventor—Rees, et al.; Applicant—Columbia Insurance Co.) (10 pages).
Response to Restriction Requirement filed on May 8, 2012 with the United States Patent and Trademark Office for U.S. Appl. No. 12/786,044, filed May 24, 2010 (Inventor—Rees, et al.; Applicant—Columbia Insurance Co.) (2 pages).
Restriction Requirement Issued Mar. 8, 2012 by the United States Patent and Trademark Office for U.S. Appl. No. 12/786,044, filed May 24, 2010 (Inventor—Rees, et al.; Applicant—Columbia Insurance Co.) (6 pages).
Non-Final Rejection issued Jun. 13, 2012 by the United States Patent and Trademark Office for U.S. Appl. No. 12/786,044, filed May 24, 2010 (Application—Columbia Insurance Co. // Inventor—Rees, et al.) (pp. 1-9).

Notice of Appeal filed on Apr. 8, 2015 with the United States Patent and Trademark Office for U.S. Appl. No. 12/786,036, filed May 24, 2010 (Inventor—Rees; Applicant—Columbia Insurance Co.) (2 pages).
Final Office Action issued on Oct. 8, 2014 by the United States Patent and Trademark Office for U.S. Appl. No. 12/786,036, filed May 24, 2010 (Inventor—Rees; Applicant—Columbia Insurance Co.) (30 pages).
Response to Non-Final Office Action filed Aug. 27, 2014 with the United States Patent and Trademark Office for U.S. Appl. No. 12/786,036, filed May 24, 2010 (Inventor—Rees; Applicant—Columbia Insurance Co.) (17 pages).
Non-Final Office Action issued on Feb. 27, 2014 by the United States Patent and Trademark Office for U.S. Appl. No. 12/786,036, filed May 24, 2010 (Inventor—Rees; Applicant—Columbia Insurance Co.) (26 pages).
Response to Final Office Action filed Feb. 11, 2014 with the United States Patent and Trademark Office for U.S. Appl. No. 12/786,036, filed May 24, 2010 (Inventor—Rees; Applicant—Columbia Insurance Co.) (16 pages).
Notice of Appeal filed Oct. 10, 2013 with the United States Patent and Trademark Office for U.S. Appl. No. 12/786,036, filed May 24, 2010 (Inventor—Rees; Applicant—Columbia Insurance Co.) (2 pages).
Final Office Action issued on Apr. 11, 2013 by the United States Patent and Trademark Office for U.S. Appl. No. 12/786,036, filed May 24, 2010 (Inventor—Rees; Applicant—Columbia Insurance Co.) (17 pages).
Response to Non-Final Office Action filed Mar. 26, 2013 with the United States Patent and Trademark Office for U.S. Appl. No. 12/786,036, filed May 24, 2010 (Inventor—Rees; Applicant—Columbia Insurance Co.) (15 pages).
Non-Final Office Action issued Sep. 26, 2012 by the United States Patent and Trademark Office for U.S. Appl. No. 12/786,036, filed May 24, 2010 (Inventor—Rees, et al.; Applicant—Columbia Insurance Co.) (9 pages).
Response to Restriction Requirement filed Aug. 28, 2012 to the United States Patent and Trademark Office for U.S. Appl. No. 12/786,036, filed May 24, 2010 (Inventor—Rees et al.; Applicant—Columbia Insurance Co.) (2 pages).
Requirement for Restriction/Election issued Jun. 28, 2012 by the United States Patent and Trademark Office for U.S. Appl. No. 12/786,036, filed May 24, 2010 (Inventor—Rees et al.; Applicant—Columbia Insurance Co.) (7 pages).
Non-Final Office Action issued on Aug. 27, 2015 by the United States Patent and Trademark Office for U.S. Appl. No. 12/786,036, filed May 24, 2010 (Inventor—Rees; Applicant—Columbia Insurance Co.) (12 pages).
Non-Final Office Action issued on Sep. 16, 2015 by the United States Patent and Trademark Office for U.S. Appl. No. 12/786,044, filed May 24, 2010 (Inventor—Rees, et al.; Applicant—Columbia Insurance Co.) (17 pages).
Final Rejection issued on Mar. 24, 2016 by the United States Patent and Trademark Office for U.S. Appl. No. 12/786,036, filed May 24, 2010 (Applicant—Columbia Insurance Co. // Inventor—Rees, et al.) (7 pages).
Notice of Allowance issued on Apr. 5, 2016 by the United States Patent and Trademark Office for U.S. Appl. No. 12/786,044, filed May 24, 2010 (Inventor—Rees, et al.; Applicant—Columbia Insurance Co.) (10 pages).
U.S. Appl. No. 12/786,036, filed May 24, 2010, Rees, et al.
U.S. Appl. No. 12/786,044, filed May 24, 2010, Rees, et al.

* cited by examiner

HIGH DENSITY COMPOSITES COMPRISING RECLAIMED CARPET MATERIAL

CROSS-REFERENCE TO RELATED APPLICATIONS

The present invention claims the benefit of priority to U.S. Provisional Patent Application Ser. No. 61/180,709, filed May 22, 2009, the entire disclosure of which is incorporated by reference herein for all purposes.

FIELD OF THE INVENTION

The present invention relates generally to methods of using reclaimed carpet material such as post consumer carpet, in the manufacture of high density composites. Also provided are the products produced by the disclosed methods.

BACKGROUND OF THE INVENTION

Carpet is a common floor covering used in many businesses and residences. While well-made carpet is generally versatile and long-lasting, carpet waste nonetheless represents a growing concern in both private industry and governments. Carpet waste can include, for example, post consumer carpet, including commercial, industrial and residential waste carpet; manufacturing remnants; quality control failures, and the like. Waste carpet can be used carpet, e.g., carpet removed from an apartment complex, or unused carpet, e.g., residual carpet left from an installation or manufacturing process.

Unfortunately, most carpet waste is currently disposed of in landfills. While most estimates indicate that carpet waste constitutes only 1 to 2% of all municipal solid waste, this amount still represents a vast quantity of waste that can have a substantial economic and environmental impact. As a result, many in the industry have turned to carpet recycling as a solution to carpet waste. Recycling carpet, however, is difficult because its major components are chemically and physically diverse. Most carpets comprise about 20-50 weight percent face fiber, the remainder being backing materials, commonly polypropylene, and an adhesive which attaches the carpet fiber to the backing material. The adhesive typically comprises a carboxylated styrene-butadiene (XSB) latex copolymer, and inorganic filler like calcium carbonate.

Most carpet recycling methods to date have focused on recycling certain environmentally malignant constituents of carpet. Examples include polymers, such as nylon, and adhesive constituents found in waste carpet. However, little attention has been devoted to the various other constituents of carpet, such as inorganic filler. While such constituents may not present a direct environmental harm, they nonetheless represent a potential cost savings and a reduction in landfilling burden. If such materials could be reclaimed and recycled, the supply of such materials could be augmented, thereby reducing the burden to manufacture new materials. In addition, such broad-based recycling methods can also potentially help to comport with National Sanitation Foundation (NSF) 140/2007 recommendations, which encourage carpet industries to develop sustainable carpet manufacturing and recycling programs for social, economic, and environmental benefits. Accordingly, a need exists for new and improved methods for disposing of or recycling reclaimed carpet material. These needs and other needs are at least partially satisfied by the present invention.

SUMMARY

The present invention provides a variety of methods for using reclaimed carpet material in the manufacture of relatively high density composite, which can be used, for example, as a floor covering, decking, or wall covering. various products. In one aspect, the present invention provides a method of making a high density composite from reclaimed carpet material. The method generally comprises providing a composite layer of reclaimed carpet material and low melt thermoplastic binder resin and then heating the composite layer at a temperature sufficient to melt the thermoplastic binder resin. The heated composite can then be subjected to pressure sufficient to substantially consolidate the melted binder and reclaimed carpet material and to form a composite having a desired density and thickness.

In another aspect, the present invention provides another method of making a high density flooring underlayment. The method according to this aspect generally comprises providing a composite layer of reclaimed carpet material, wherein a portion of the reclaimed carpet material comprises polypropylene and heating the composite layer at a temperature sufficient to melt at least a portion of the polypropylene. The heated composite can again be subjected to pressure sufficient to substantially consolidate the melted binder and reclaimed carpet material and to form a composite having a desired density and thickness.

In still further aspects, the present invention provides the composites that can be manufactured from the summarized methods. For example, the present invention provides a high-density composite comprising reclaimed carpet material and wherein the composite has a density of from 10 to 100 pounds per cubic foot.

Additional aspects of the invention will be set forth, in part, in the detailed description, FIGURES, and claims which follow, and in part will be derived from the detailed description, or can be learned by practice of the invention. It is to be understood that both the foregoing general description and the following detailed description are exemplary and explanatory only and are not restrictive of the invention as disclosed.

DETAILED DESCRIPTION

The present invention can be understood more readily by reference to the following detailed description, examples, drawings, and claims, and their previous and following description. However, before the present articles, systems, and/or methods are disclosed and described, it is to be understood that this invention is not limited to the specific or exemplary aspects of articles, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those of ordinary skill in the pertinent art will recognize that many modifications and adaptations to the present invention are possible and may even be desirable in certain circumstances and are a part of the present invention. Thus, the following description is again provided as illustrative of the principles of the present invention and not in limitation thereof.

As used herein, the singular forms "a," "an" and "the" include plural referents unless the context clearly dictates otherwise. Thus, for example, reference to a "reclaimed carpet material" includes aspects having two or more such reclaimed carpet materials unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It should be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

A weight percent of a component, unless specifically stated to the contrary, is based on the total weight of the formulation or composition in which the component is included.

As used herein, and unless the context clearly indicates otherwise, the term "carpet" is used to generically include broadloom carpet, carpet tiles, and even area rugs. To that end, the term "broadloom carpet" refers to a broadloom textile flooring product manufactured for and intended to be used in roll form. The term "carpet tile" refers to a modular floor covering, conventionally manufactured in 18"×18," 24"×24" or 36"×36" squares, but other sizes and shapes are also within the scope of the present invention. Any of these exemplary carpets can be woven, nonwoven, tufted, or needle-punched.

As used herein, "reclaimed carpet material" refers generally to any material obtained from a prior manufactured carpet product. The prior manufactured carpet product can be a post consumer product, such as, for example, a post residential, post commercial, post industrial carpet. Alternatively, the reclaimed carpet material can be a pre-consumer product, such as manufacturing remnants or quality control failures. The reclaimed carpet material can be synthetic, such as, for example a material comprising one or more of nylon 6/6, nylon 6, polyester, polypropylene, polyethylene, polyurethane, polyvinyl chloride, polyethylene terephthalate, polytrimethylene terephthalate, latex, styrene butadiene rubber, or any combination thereof. Additionally, the reclaimed carpet material can comprise natural fibers, such as cotton, wool, or jute. According to aspects of the invention, a reclaimed carpet material comprising synthetic and/or natural materials described above can optionally be present as a reclaimed carpet fiber. Any one or more of the above disclosed materials can be obtained from various component parts of the prior manufactured carpet product, for example and without limitation, a reclaimed carpet material can be obtained from a face layer, an adhesive layer, a backing layer, a secondary backing layer, an underlayment, a cushioning material, a reinforcing layer, or a scrim.

Additionally, the reclaimed carpet material can also comprise fillers. The fillers can be any suitable filler, including, for example, aluminum oxide trihydrate (alumina), calcium carbonate, barium sulfate or mixtures thereof. The fillers can be virgin filler, waste material, or even reclaimed fillers. Examples of recycled fillers include coal fly ash and calcium carbonate.

The reclaimed carpet material can be obtained from a variety of sources. In one example, the reclaimed carpet material can be obtained from a collection site. Approximately 50 collection sites are positioned throughout the United States. These collection sites take in post consumer carpet which is then shipped to a facility for sorting according to fiber type. Once sorted, baled material of primarily the same or similar fiber type is then shipped to a secondary location where various techniques are employed for reducing the large pieces of carpet to small chunks or shredded fiber and to provide an amalgamated mixture. The amalgamated mixture will typically contain face fibers, primary backing, secondary backing, carpet binder and, in some cases, attached cushion. After this stage, the product can be used with or without further refinement or processing to remove additional contaminates.

For use in connection with various aspects of the present invention and, dependant on the end use and desired cost of the product, reclaimed carpet material can comprise a relatively coarse blend of ground or shredded post consumer carpet (PCC) or a more refined less coarse material containing primarily opened carpet face fibers. According to some aspects, the reclaimed carpet material can for example comprise relatively coarse slit tape fibers derived from reclaimed primary and secondary backing materials. The coarse material is able to provide a low-cost structural material that can serve as reinforcement for high density composites described herein. In some aspects, additional processing steps can be desirable. For example, the post consumer carpet material can be further chopped or sheared into any desired size, including for example, fiber or tape yarn lengths in the range of from about 1/64" to about 1/2".

According to certain aspects, the fibrous material present within the reclaimed carpet material exhibits a substantially uniform size, including substantially uniform liner density measured in denier units and substantially uniform fiber lengths. However, in alternative aspects, fibers present within the reclaimed carpet material can have non-uniform linear densities and non-uniform fiber lengths. According to these aspects, a population of reclaimed carpet fibers having non-uniform linear fiber densities can, for example, have individual linear fiber densities in the range of from 1 to 25 denier. Still further, a population of reclaimed carpet fibers having non-uniform linear density can collectively provide an average linear fiber density that is, for example, greater than 5 denier, greater than 10 denier, greater than 15 denier, greater than 20 denier, or even greater than 25 denier.

In addition to fibrous reclaimed carpet material described above, it should be appreciated that reclaimed carpet material can further comprise one or more impurities. For example, representative impurities that can be present in reclaimed carpet material and thus present in the articles described herein include dirt, sand, oil, inorganic filler, and other conventionally known waste materials that can be present in reclaimed carpet material.

By incorporating reclaimed carpet material into the composite structures of the present invention several advantages can be realized. For example, second generation products incorporating the reclaimed material have less of an environmental footprint relative to traditional composites, comprising only virgin materials. In a further aspect, the use of reclaimed carpet material reduces the amount of traditional, often environmentally harmful materials that previously were sent to landfill, while still providing the same or similar level of composite performance. Still further, substitution of virgin material with reclaimed carpet material can reduce the manufacturing costs associated with producing various composite products, such as floor covering products. Additionally, the incorporation of reclaimed carpet material into a second generation composite can also provide mechanical reinforcement or stability to the second generation composite, if desired.

As summarized above, the present invention provides method for making a high density composite from reclaimed carpet material. The method generally comprises providing a composite layer of reclaimed carpet material and low melt thermoplastic binder resin and then heating the composite layer at a temperature sufficient to melt the thermoplastic binder resin. The heated composite layer is also subjected to pressure sufficient to substantially consolidate the melted binder and reclaimed carpet material and to form a composite having a desired density and thickness. The formed composite can then be cooled to ambient temperature.

Suitable reclaimed carpet material for forming the composite layer can comprise any one or more of the reclaimed carpet materials described above. For example, in exemplary and non limiting aspects, suitable reclaimed carpet material comprises fibers of one or more thermoplastic polymer. Exemplary thermoplastic polymers include nylon 6/6, nylon 6, polyester, polypropylene, polyethylene, polyurethane, polyvinyl chloride, polyethylene terephthalate, polytrimethylene terephthalate, latex, styrene butadiene rubber, or any combination thereof. In one aspect, the reclaimed carpet material comprises foam waste. In another aspect, the reclaimed carpet material does not comprise foam waste. Additionally, the reclaimed carpet material can comprise natural fibers, such as wool or jute. Reclaimed carpet material comprising synthetic and/or natural materials described above can optionally be present as a fiber. The reclaimed carpet material can also comprise fillers. The fillers can be any suitable filler, including, for example, aluminum oxide trihydrate (alumina), calcium carbonate, barium sulfate or mixtures thereof. The fillers can be virgin, waste material, or even reclaimed fillers.

The reclaimed carpet material can be present in the final high density composite in any desired amount, including for example an amount in the range of from greater than 0% to 100% by weight, including exemplary amounts of 5%, 10%, 15%, 20%, 25%, 30%, 35%, 40%, 45%, 50%, 55%, 60%, 65%, 70%, 75%, 80%, 85%, 90%, and 95%. In still further aspects, the reclaimed carpet material can be present in an amount within any range derived from the above values, including for example, an amount in the range of from greater than 0 weight percent to 90 weight percent, from 30 weight percent to 70 weight percent, or from 40 weight percent to 60 weight percent. In still other aspects, the composite comprises at least about 50% reclaimed carpet material, such as post consumer carpet material, post industrial carpet material, post commercial carpet material, or a combination thereof. In another aspect, the composite comprises from about 50% to about 100% reclaimed carpet material.

According to aspects that comprise less than 100% reclaimed carpet material, other materials can of course be present, including without limitation binder, filler materials such as calcium carbonate, mica, fiberglass, wood, wollastonite (calcium silicate) and talc (magnesium silicate), rubber, other minerals and ground recycled materials.

The reclaimed carpet material can be obtained from various component parts of the prior manufactured carpet product, for example, without limitation, a face layer, an adhesive layer, a backing layer, a secondary backing layer, an underlayment, a cushioning material, or a scrim. Likewise, the reclaimed carpet material can be obtained from a variety of sources. In one example, the reclaimed carpet material can be obtained from a collection site. Approximately 50 collection sites are spread around the United States. The collection sites take in post consumer carpet which is then shipped to a facility for sorting by fiber type. Once sorted, baled material of the same fiber type is then shipped to a secondary location where various techniques are employed for reducing the large pieces of carpet to small chunks or shredded fiber to provide an amalgamated mixture. The amalgamated mixture will contain face fiber, primary backing, secondary backing, carpet binder and, in some cases, attached cushion. After this stage, the product can be used with or without further refinement or processing to remove additional contaminates.

Dependant on the end use and desired cost of the composite, the reclaimed carpet material can comprise a coarse blend of ground/shredded post consumer carpet (PCC) or a more refined material containing primarily opened carpet face fibers. An unexpected benefit of the processes disclosed herein is the use of the coarse slit tape fibers derived from primary and secondary backing materials. The coarse material/fibers provides a low-cost structural material that can serve as reinforcement for the high density composites described herein. In some aspects, additional processing steps can be desirable. For example, the post consumer carpet material can be chopped or sheared into fiber or tape yarn lengths of from about 1/64" to about 1/2".

The structural integrity of the high density composites is generally maintained through the use of a binder, which is melted during the manufacturing process and which aids in the formation of the composite by binding the reclaimed carpet material and optional other components together. In one aspect, the low melt binder component can be preblended with the reclaimed carpet material prior to forming the composite layer. Alternatively, the low melt binder component can be added separately after formation of composite layer. Still further, the low melt binder component can be present as a component provided within the reclaimed carpet material and thus eliminating the need for any added low melt binder component. Exemplary low melt binders that can typically be present in provided reclaimed carpet material include without limitation a wide variety of poly(olefins), such as polypropylene or polyethylene.

The low-melt binder material is selected to melt at a relatively low temperature relative to surrounding, higher-melt materials within the composite layer so as to leave the higher-melt materials intact. As one having ordinary skill in the pertinent art will appreciate, upon the application of sufficient heat to a composite layer comprising low-melt material, the low-melt material can melt and flow onto adjacent reclaimed carpet materials. As one having ordinary skill in the pertinent art will further appreciate, after the low-melt material is re-cured, adjacent materials therein the composite layer are effectively adhered or fused together. Typical manufacturers of low-melt materials as described herein include Wellman, Inc., Fiber Innovations, Inc., Huvis Corp., Tuntex Textile Co., Ltd., Stein, Inc., Reliance Industries, Ltd., and Teijin, Ltd. In one aspect, the at least one low-melt material can comprise a relatively fine denier low-melt material.

In another aspect, the at least one low-melt material can comprise a low-melt fiber, including, for example and without limitation, low-melt polyester, polypropylene, polyethylene, copolyester, copolymer nylons, engineered olefins, conjugate filament-linear low-density polyethylene, acrylics, low-melt nylon, and the like. As one having ordinary skill in the pertinent art will appreciate, the heating of a low-melt fiber can create globules of low-melt polymer at crossover points where the low-melt fibers intersect with higher-melt fibers. In an additional aspect, the at least one low-melt material can comprise glycol-modified polyethylene terephthalate (PETG).

In a further aspect, the at least one low-melt material can comprise an elastomeric low-melt fiber, including, for example and without limitation, ethylene vinyl acetate (EVA), thermoplastic elastomers (TPE), thermoplastic rubbers, thermoplastic olefins, and the like. As one having ordinary skill in the pertinent art will appreciate, the heating and re-curing of elastomeric low-melt fibers can create stretchable crossover points where the elastomeric low-melt fibers intersect with higher-melt fibers, thereby improving the load-bearing capabilities of the composite.

In an additional aspect, the at least one low-melt material can comprise a bi-component fiber having a portion of high- or standard-melt material and a portion of low-melt polymer. In this aspect, the bi-component fiber configuration can be, for example and without limitation, islands-in-the-sea, side-by-side, core-sheath, and the like. As one having ordinary skill in the pertinent art will appreciate, bi-component fibers can maintain their original structural integrity while also allowing each fiber to glue itself to adjacent fibers. As one having ordinary skill in the pertinent art will further appreciate, the use of bi-component fibers increases the amount and strength of bonding between adjacent fibers due to the increased length of axial contact between the fibers. It is contemplated that any known materials having appropriate melt characteristics can be used to form the bi-component fibers.

In a further aspect, the at least one low-melt material can comprise a low-melt powder, flake, or granule. It is contemplated that any of the above-referenced materials can be provided in a powder, flake, or granule form. In one aspect, scattering machines can be used to evenly disperse the low-melt powders, flakes, and granules throughout a substrate. Manufacturers of these conventional scattering machines include TechnoPartner Samtronic, Technoboard, Caritec, and Schott Meissner.

The at least one low-melt binder material can be present in the final high density composite in any desired amount, including for example an amount in the range of from greater than 0% to 100% by weight, including exemplary amounts of 5%, 10%, 15%, 20%, 25%, 30%, 35%, 40%, 45%, 50%, 55%, 60%, 65%, 70%, 75%, 80%, 85%, 90%, and 95%. In still further aspects, the at least one low-melt binder material can be present in an amount within any range derived from the above values, including for example, an amount in the range from about 0% to about 80% of the total amount of material present within the composite, alternatively from about 5% to about 60% of the total amount of material in the composite, or still alternatively from about 10% to about 50% of the total amount of material in the composite. In another aspect, the at least one low-melt material can have a denier per foot from about 0.1 to about 30, more preferably from about 0.5 to about 15, and most preferably from about 1 to about 5.

The disclosed high density composites can be manufactured to have a wide variety of sizes, shapes, and densities. Generally, the composites have a high density. In one aspect, the composite has a density of from about 5 to about 100 pounds per cubic foot, including exemplary densities of 10, 15, 20, 25, 30, 35, 40, 45, 50, 55, 60, 65, 70, 75, 80, 85, 90, and 95 pounds per cubic foot. In still further aspects, the volumetric density can a value within any range derived from the above values, including for example, a density of from about 15 to about 75 pounds per cubic foot.

The composites can generally have any desired shape. In one aspect, the composite is substantially planar. Planar composites can be useful for floor coverings, such as underlayments, or decking material, wall boards, and the like. The planar composites can be manufactured into any desired size, which will generally depend on the targeted application. In one aspect, the planar composite can have a length dimension greater than a width dimension. For example, the planar composite can be sized as a sheet, for example, a 4'×8' sheet. Such a sheet can be cut into smaller sizes as needed. In other aspects, the composites can be sized into a 4"×8' composite, or a 4"×10' composite, among other elongate sizes. Elongate composites can be useful, for example, as decking materials. The composites can also have any desired thickness. In one aspect, the composite has a thickness of from about 0.25 to about 3 inches, or 0.5 inches to 1.0 inches, or from about 0.25 to about 0.75 inches, or from about 0.6 to about 0.75 inches. In a further aspect, the composite can have a suitable shape and dimension commonly used in floor tile, wall tile, ceiling tile, including but not limited to dimensions such as 1"×1", 2"×2", 3"×3", 3"×5", and the like. Other shapes include diamond, rectangles, triangles, rounds and other shapes.

The disclosed composites can also contain face embossing to provide visuals and textures to duplicate wood grain, slate and other visuals commonly seen in floor covering. Laser etching can also be utilized in lieu of embossing to achieve the desired aesthetics. Some other potential methods for texturing the surface of wall board, flooring materials or roofing products include drag wiring while the temperature of an extruded product is still above glass transition temperature or dragging probes across the surface while the product or probe is moving. Further, a texture can be embedded in the surface of an injection mold, compression mold or vacuum form mold, as well. A texture can also be hot or cold stamped with pressure for creating the desired look. In another aspect stamped and embossed exterior wall board can be used in lieu of natural wood, vinyl siding, or composite cement and fiber plank siding.

In another aspect, synthetic shingles using post consumer carpet can be obtained utilizing stamped molding or vacuum molding with a cutting press. An additional layer of fiberglass can be added as a backer material to impart dimensional stability or sandwich between dual sheets of composite post consumer carpet stock. Interlocking tabs can be useful for attaching each panel or each dimensioned shape together as the rigidity of the material provides excellent strength and impact resistance.

In still a further aspect, it is contemplated that the composites of the present invention can replace convention vinyl and resilient sheet flooring backing, plank backing, or tile backing. According to these aspect, the composite cane comprise reclaimed carpet material as a base carrier with optional additional components such as organic or inorganic color pigments, mica, minerals, glass or other substances to impart surface aesthetics. In an additional aspect an aesthetic layer such as a thin veneer of slate, ceramic, stone, wood, cork, printed image, or a film or nonwoven material can be adhered to a substrate. For this aspect, an additional wear layer can be useful to provide a protective cap or finish for foot traffic or to enhance durability. The glue can be from hot melt adhesive, extrusion coating, flame lamination, pressure sensitive adhesive, thermoplastic powder or post consumer carpet fibers that have been reactivated or other adhesive technologies. Adhesive materials can be thermoplastics (such as polypropylene, nylon 6, nylon6,6, polyester, PTT, or polyethylene), acrylic, polyurethane or any other common adhesive technology.

Figure 1:
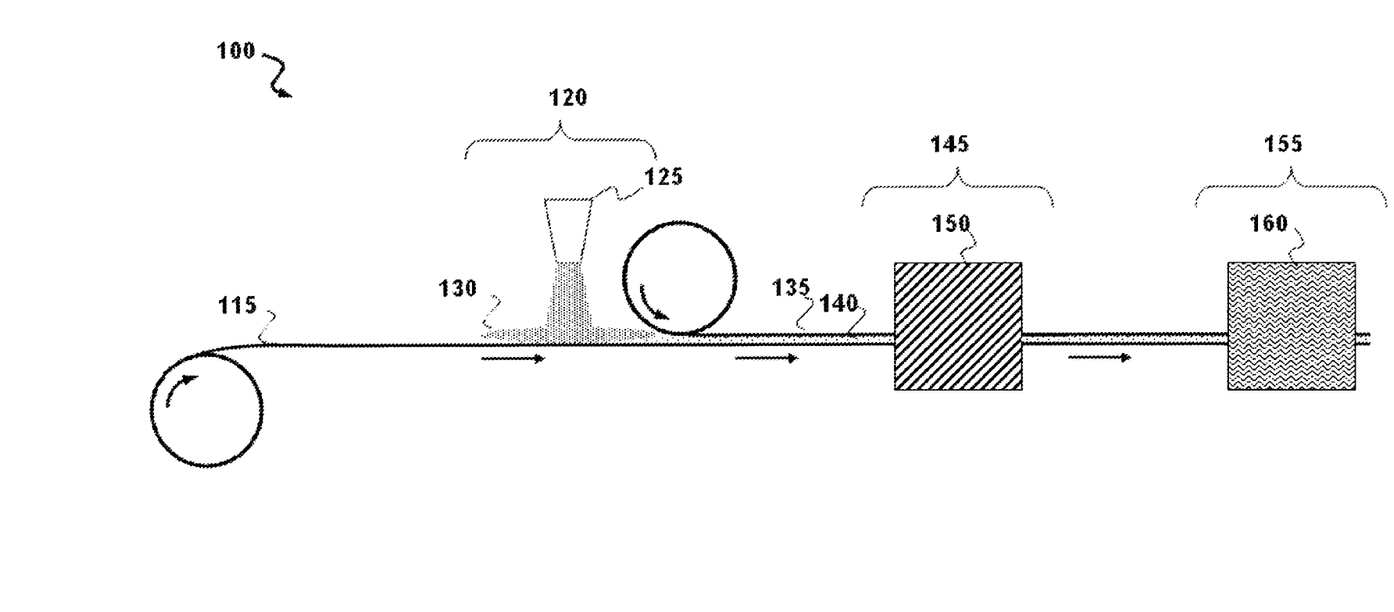
The FIGURE is a schematic illustration of a process and apparatus for forming a high density composite according to various aspects of the present invention.

The disclosed composites can be provided by various methods. In one aspect, the composite is made through a belt driven conveyer process, which can be either continuous or discontinuous (batch). An exemplary apparatus suitable for making the composites is partially shown in the FIGURE. As shown, a lower moving belt reaches a material loading zone 120, and the reclaimed carpet material 135 is applied to the lower belt. The reclaimed material can be applied through a number of means, for example through a silo (125 as shown in the FIGURE) which releases the reclaimed material onto the lower belt at a desired rate. The reclaimed carpet material can be applied to a belt in the form of fibers, flakes, granular material, and the like. The reclaimed material can be reduced to flake size by various means including cutting, shredding, slicing, chopping, tearing or a combination thereof.

Depending on how the reclaimed material is applied to the belt, it can be desirable to evenly distribute the reclaimed material across the belt through a suitable process, such as carding, cross lapping, or fiber scattering, among others, to thereby form a composite layer (140 in the FIGURE). Optionally, a low melt thermoplastic binder resin can be added to the composite layer. When a low melt binder is desired, for example, the reclaimed carpet material can be conveyed either mechanically or pneumatically to a low melt binder applicator. In this aspect, application of the binder to the reclaimed carpet material can be accomplished by suspending the reclaimed material in swirling air and spraying the binder directly or by creating an atomized atmosphere through which the binder moves, or both. Generally, the amount of binder to be applied to the reclaimed material will depend on the type of binder used and the desired cohesive strength.

With reference again to the FIGURE, once the composite layer is formed on the lower belt 115, an upper belt 135 can be used to convey the material to other processing zones. In one aspect, the lower belt 115 and the upper belt 135 can be used to maintain a desired thickness of the composite layer and/or compress and shape the composite layer. In a further aspect, the distance between the lower and upper conveyor belt is approximately equal to the thickness of the composite to be manufactured, including any of those thicknesses disclosed above.

The upper and lower belts can then convey the composite layer into a heating zone 145, where, for example, the composite layer can be heated using an oven 150, although other heating mechanisms are possible. Depending on the temperature at which the composite layer is heated, the use of heat resistant conveyer belts can be desired. Generally, the composite layer is heated to a temperature sufficient to at least partially melt the low melt binder. Typical low melt binders melt at a temperature of at least about 250° F. In one aspect, the composite layer is subjected to a temperature of from about 250° F. to about 800° F. to thereby melt the thermoplastic binder. Exemplary non-limiting temperatures at which the low melt binder can be heated include 300° F., 350° F., 400° F., 450° F., 500° F., 550° F., 600° F., 700° F., and 750° F.

Exemplary composites can be produced at relatively high heat and pressure wherein no low melt binder is separately added, to produce a pressed fibrous sheet material comprised of reclaimed post consumer carpet. In the absence of a low melt binder, a high percentage of polypropylene post consumer carpet can be added and heated to approximately 430° F., thereby beginning to melt the polypropylene within the reclaimed carpet material, which can then serve as a binder replacement material. The resulting flow of the polypropylene material can provide a sheet composite thoroughly impregnated with post consumer carpet. In still further aspects, post consumer carpet fiber can be used as a binder by melting the post consumer carpet at a temperature above about 475° F. The requisite temperature for this process will generally depends on the fiber types present in the reclaimed carpet material.

During or after the heating step, the composite layer can optionally be subjected to a pressure sufficient to substantially consolidate the melted binder and reclaimed carpet material to form a composite. Generally, suitable pressures range from above 0 to about 1000 pounds per square inch (psi), including for example, from about 100 to 1000 psi, from about 250 to 1000 psi, from about 500 to 750 psi, or from about 600 to 700 psi.

Once the composite is heated and optionally subjected to pressure, the formed composite can then be cooled. As shown in the FIGURE, for example, the upper 135 and lower 115 conveyer belts can convey the formed composite layer to a cooling zone 155, which comprises a cooling chamber 160. It is understood that further steps can be carried out during the process, as desired. For example, the composite can optionally be post pressed, smoothed, embossed or contoured to obtain various functional or aesthetic effects. Additionally, other optional materials can be applied to composite layer or the formed composite during the manufacturing process.

In connection with any of the inventive aspects described herein, the methods can optionally comprise a sanitization step. As one of skill in the art will appreciate, the presence of impurities in reclaimed carpet material can necessitate a need to sanitize the reclaimed materials for health and safety purposes. To that end, the reclaimed carpet material can be subjected to a sanitization step at any point during the manufacture of the high density composite including, sanitizing the reclaimed carpet material prior to its use in the methods described herein or alternatively by sanitizing the reclaimed carpet material during or after formation of the composite

EXAMPLES

To further illustrate the principles of the present invention, the following examples are put forth so as to provide those of ordinary skill in the art with a complete disclosure and description of how the various aspects of the invention disclosed herein can be made and/or evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations may have occurred. Unless indicated otherwise, parts are parts by weight, temperature is degrees C. or is at ambient temperature, and pressure is at or near atmospheric or full vacuum.

Example 1. Preparation of High Density Composites

Six exemplary high density composites can be prepared on a belted "heat and smash" line using thermo-fixation to produce hard surface prototypes from each individual post consumer carpet raw material mixture. The reclaimed carpet material formulation for each of the six exemplary samples is set forth in Table 1.

Table 1

TABLE 1

| | Purity | PA66 | PP | CaCO$_3$ | SBR | Other |
|---|---|---|---|---|---|---|
| Granulated Fiber | | | | | | |
| Fine Ground Sheared PCC | Low | 44.0% | 15.8% | 29.5% | 7.4% | 3.3% N6 |
| Fine Ground N66 PCC | Low | 65.8% | 17.5% | 13.4% | 3.3% | — |
| Fine Ground and Sheared N66 PCC Face Fiber | High | 98.7% | 0.5% | — | — | 0.8% |
| Fine Ground Polypropylene PCC | Low | — | 82.3% | 13.7% | 3.4% | 0.5% N6 |
| Pellets or Chip | | | | | | |
| Polypropylene PCC | Medium | 7.0% | 89.0% | 3.0% | 1.0% | — |
| Polypropylene PCC | Low | — | 52.6% | 37.9% | 9.5% | — |

The post consumer carpet (PCC) feed form in Table 1 is identified by how much nylon 66 (PA66), polypropylene (PP), calcium carbonate (CaCO$_3$) and SBR latex rubber (SBR) is in the mix. The other category represents miscellaneous materials, including nylon 6 (N6) that may have been present. The mixture for each trial was evenly placed on a belt and then passed through an oven for even heating at a temperature of 250° C. to melt the polypropylene content. Top and bottom belts densify or squeeze the reclaimed carpet materials to a desired thickness. A cooling zone then drops the melt temperature to provide a solid hard surface material.

The granulated fibers for the first four samples were obtained by collecting post consumer carpet material, shredding for fiber, hammermilling for contaminate removal, fine grinding for shortening the fiber, and homogenizing.

The pellet or chip based PCC materials utilized for the additional two samples can be obtained according to various methods. According to one method, the post consumer carpet can be shredded while removing some of the loosened calcium carbonate and SBR. The fibrous substrate can then be sent to a continuous mixer that melts all of the fibrous material in to a molten glob. This material is then fed to the feed throat of an extruder to form into multiple extruded strands. These strands are then passed through a water quench bath to cool the strands down to a solid. The solid strands are then fed to a chopper to form into actual pellets.

According to an alternative method, pelletizing can involve feeding collected post consumer carpet flats through a shearing machine to remove the face fiber from the carpet backing. The sheared fiber can then be sent through a cleaning process, such as trommel wheel, vibratory screener, multi-aspirator, rotary sifter, wet centrifugal separation or step separator for removal of contaminates. After cleaning, the material can be blended, baled and/or densified (using agglomeration, condux or California Pelletizing) prior to being fed to an extruder for the stranded, quenched, melt filtered and chopped pellets.

Example 2. High Density Composites by Compression Molding

Exemplary samples can also be produced using a cruder form of shredded post consumer carpet using compression molding technology. This process is similar to thermo-fixation except it is a batch process. Compression molding allows the significant pressures to be built without "extruding" molten polymer laterally out of the sides as on a belted line. This methodology creates a denser and thicker material. At least three techniques can be used for compression molding. The first technique uses a "hot shot" to shoot pre-melted thermoplastic material into the mold to reduce cycle time. The second method simply places the thermoplastic polymeric materials into a heated mold for melting. Both the first and second methods can either melt the entire mix or melt a lower melting binder material to bind the other materials together to form a solid matrix. The third method uses thermoplastic polymeric materials bound together with a thermoset binder that is heat activated for curing. This is the preferred method. The binder used can be a low viscosity corn syrup bio-thermoset resin with no formaldehyde. An exemplary batch or mix can consist of 97% shredded polyester face fiber post consumer carpet and 3% thermoset resin binder. Other thermoset binders can be used such as epoxy, phenolic, polyurethane, and the like. The shredded reclaimed carpet material can itself comprise approximately 66% polyester, 17% polypropylene, 13% calcium carbonate and 3% SBR latex rubber and 1% contaminates.

Other exemplary compression mold samples can include PCC materials combined with the same binder system shown above. Specifically, the following mixes can be made with approximately 44% nylon 66, 16% polypropylene, 30% calcium carbonate, 7% SBR latex rubber and 3% contaminates. Still further, an additional sample can be produced using a shredded PCC mix of approximately 82% polypropylene, 14% calcium carbonate, 3% SBR latex rubber and 1% contaminates.

Example 3. Injection Molding/Profile Extrusion

In still another example, pelletized material as discussed above, can be fed into an injection molding or profile extrusion machine. Using post consumer carpet based pellets, parts can be made as either filled, unfilled, foamed or unfoamed. Additionally, compounded pellets can be produced by blending the post consumer carpet pellet material with fillers, such as calcium carbonate, mica, fiberglass, wood, wollastonite (calcium silicate) and talc (magnesium silicate), rubber, other minerals, and ground recycled materials. Other additives such as colorants, tints, dyes, compatibilizers, process aids, chemical foaming agents, antimicrobial treatments, UV stabilizers can also be part of the compounded recipe. Once in a compounded form, the resin pellets can be dryed and added to a hopper for feeding the injection molding machine or profile extruder. The molded or extruded product can be foamed for weight reduction and thermoplastic polymer savings, using for example chemical foaming agents that form gas bubbles from chemical reactions or by using physical gas blowing agents such as carbon dioxide, nitrogen or other gases.

What is claimed is:

1. A method of making a composite from reclaimed carpet material, comprising:
   providing a composite layer of reclaimed carpet material and low melt thermoplastic binder resin;
   heating the composite layer at a temperature sufficient to melt the thermoplastic binder resin;
   subjecting the heated composite layer to pressure sufficient to substantially consolidate the melted binder and reclaimed carpet material and to form a composite having a desired density and thickness; and
   cooling the formed composite having the desired density and thickness;
   wherein the reclaimed carpet material comprises a population of reclaimed carpet fibers having non-uniform linear fiber densities; and
   wherein the formed composite has a density of from 30 to 100 pounds per cubic foot.

2. The method of claim 1, wherein the formed composite has a density of from 30 to 75 pounds per cubic foot.

3. The method of claim 1, wherein the formed composite has a thickness of about 0.5 inches to about 1 inch.

4. The method of claim 1, wherein the formed composite has a thickness of about 0.6 inches to about 0.75 inches.

5. The method of claim 1, wherein the formed composite comprises from 50% to 100% reclaimed carpet material, relative to the total weight of the composite.

6. The method of claim 1, wherein the reclaimed carpet material comprises nylon 6/6, nylon 6, polyester, polypropylene, polyethylene, polyethylene terephthalate, polytrimethylene terephthalate, latex, styrene butadiene rubber, natural fibers, or any combination thereof.

7. The method of claim 1, wherein the reclaimed carpet material comprises the low melt thermoplastic binder resin.

8. The method of claim 1, wherein the low melt binder comprises a poly(olefin).

9. The method of claim 1, wherein the low melt binder comprises polypropylene, polyethylene, or a combination thereof.

10. A method of making a flooring underlayment, comprising:
    providing a composite layer of reclaimed carpet material, wherein the reclaimed carpet material comprises a population of reclaimed carpet fibers having non-uniform linear fiber densities, and wherein a portion of the reclaimed carpet material comprises polypropylene;
    heating the composite layer at a temperature sufficient to melt at least a portion of the polypropylene;
    subjecting the heated composite layer to pressure sufficient to substantially consolidate the melted polypropylene and reclaimed carpet material and to form a composite underlayment having a desired density and thickness; and
    cooling the formed composite underlayment;
    wherein the formed composite has a density of from 30 to 100 pounds per cubic foot.

11. The method of claim 10, wherein the formed composite has a density of from 30 to 75 pounds per cubic foot.

12. The method of claim 10, wherein the formed composite has a thickness of about 0.5 inches to about 1 inch.

13. The method of claim 10, wherein the formed composite has a thickness of about 0.6 inches to about 0.75 inches.

14. The method of claim 10, wherein the formed composite comprises from 50% to 100% reclaimed carpet material.

15. The method of claim 10, wherein the reclaimed carpet material further comprises nylon 6/6, nylon 6, polyester, polyethylene, polyurethane, polyvinyl chloride, polyethylene terephthalate, polytrimethylene terephthalate, latex, styrene butadiene rubber, natural fibers, or any combination thereof.

16. The method of claim 10, wherein the temperature sufficient to melt at least a portion of the polypropylene is at least about 250° F.

17. The method of claim 10, wherein the temperature sufficient to melt at least a portion of the polypropylene is from 250° F. to 800° F.

18. The method of claim 10, wherein the pressure sufficient to substantially consolidate the melted polypropylene and reclaimed carpet material is from about 0 to about 1000 pounds per square inch.

* * * * *